Patented Aug. 14, 1934

1,969,937

UNITED STATES PATENT OFFICE 1,969,937

METHOD OF TREATING MOLDS

Charles Edgar Maynard, Northampton, Mass., assignor, by mesne assignments, to The Fisk Rubber Corporation, a corporation of Delaware No Drawing. Application September 10, 1931, Serial No. 562,195

1 Claim. (Cl. 18—48)

My invention relates to a method of treating molds used in the manufacture of rubber goods and particularly molds used in the manufacture of inner tubes for pneumatic tires. The invention has a further special application in the treatment of air bags used in molding tire casings.

One object of my invention is to secure an improved product and a further advantage is found in a decrease in the cost of maintaining the molds and air bags in proper condition. Other and further objects will be apparent from the following specification and claim.

In the manufacture of inner tubes it is desirable that the surface of the finished tube be smooth, and preferably glossy, and uniform in appearance. Inner tubes are, according to one common form of practice, molded in annular metal molds and under internal fluid pressure. In practice the tubes have a tendency to stick to the molds, resulting in difficulty in stripping the tubes from the molds and in a mottled and blemished surface on the finished tube. Furthermore, molds after a short period of use become corroded and covered with irregular deposits which give the tubes a rough and uneven surface, a condition which requires frequent "burning" and polishing of the molds to remove the deposits and the effects of corrosion.

Various attempts have been made to improve these conditions by means of so-called mold lubricants which, however, have not proved wholly satisfactory since they tend to leave a deposit on the finished article which is objectionable in appearance and, moreover, the lubricant must usually be renewed for each article.

I have found that if the molding surface of the mold is thoroughly cleaned and provided, while hot, that is, while it is substantially at working or vulcanizing temperature, with a thin coat of baking varnish, a mold surface is obtained which will resist corrosion and objectionable sulphurous deposits for a substantial period and will impart to the tube a smooth, uniform and glossy appearance. I have found that molds so treated will maintain a proper condition for a period of two weeks or longer without requiring burning or cleaning, it only being necessary to touch up the surface with the varnish, particularly around the valve opening, at the end of a day's run or as needed.

Any good quality commercial baking varnish susceptible of application to the mold at substantially vulcanizing temperatures may be used. Baking varnishes commonly used contain hard rosin, China wood oil, and linseed oil, thinned to the desired consistency and with dryers added as desired. The proportions of the ingredients above noted vary somewhat with different paint and varnish manufacturers, but for my purpose the exact proportions are not critical. If the particular commercial baking varnish used does not have sufficient body additional baking oil and pigment may be added to secure the proper consistency. While my invention is not limited to the use of any special baking varnish the following is given as illustrative of a varnish which has given satisfactory results:

50% Commercial baking varnish (#4862—Hampden Paint & Chemical Co.)
25% Prussian blue
25% Linseed oil
(All percentages by volume)

The varnish is applied to the mold at working temperature, preferably by wiping it on with a cloth, thus obtaining a very thin coating of varnish. It has been found that an objectionable chipping action results when a heavy coat of the varnish is applied, and best results are obtained when the coating is as thin as possible, consistent with complete coverage of the surface. When the varnish is applied by a brush or spray there is a tendency for the varnish coat to blister and present an uneven surface. Approximately an hour is required to permit the varnish to bake dry with the mold at working temperature.

The surface of rubber air bags upon which pneumatic casings are cured tends to corrode and crack, resulting in a blemished appearance of the interior of the casings and requiring frequent buffing or burning of the bag. I find that by varnishing the bags, while hot, with the baking varnish as above described, the length of time that the bag may be used without burning or buffing is substantially increased. It will thus be seen that my method is not limited to metal mold surfaces and it will be understood that the terms "mold" and "molding surface" as used here and in the claim are not limited to metal molds but are intended to include such mold members as rubber air bags and the like. By my method the actual molding surface is formed of a thin, hard and smooth varnish coating, and the result is a smooth, even, glossy surface on the product.

Having thus described my invention, I claim:

The method of treating molds, having conventionally finished molding surfaces, for use in molding rubber articles which comprises, wiping a thin film-like coating of baking varnish onto the molding surface while the mold is at substantially the working temperature of the mold, and permitting the coating to bake dry at that temperature.

CHARLES EDGAR MAYNARD.